April 21, 1942.   F. M. REID   2,280,302
VEHICLE UNDERCARRIAGE
Filed March 16, 1940   2 Sheets-Sheet 1
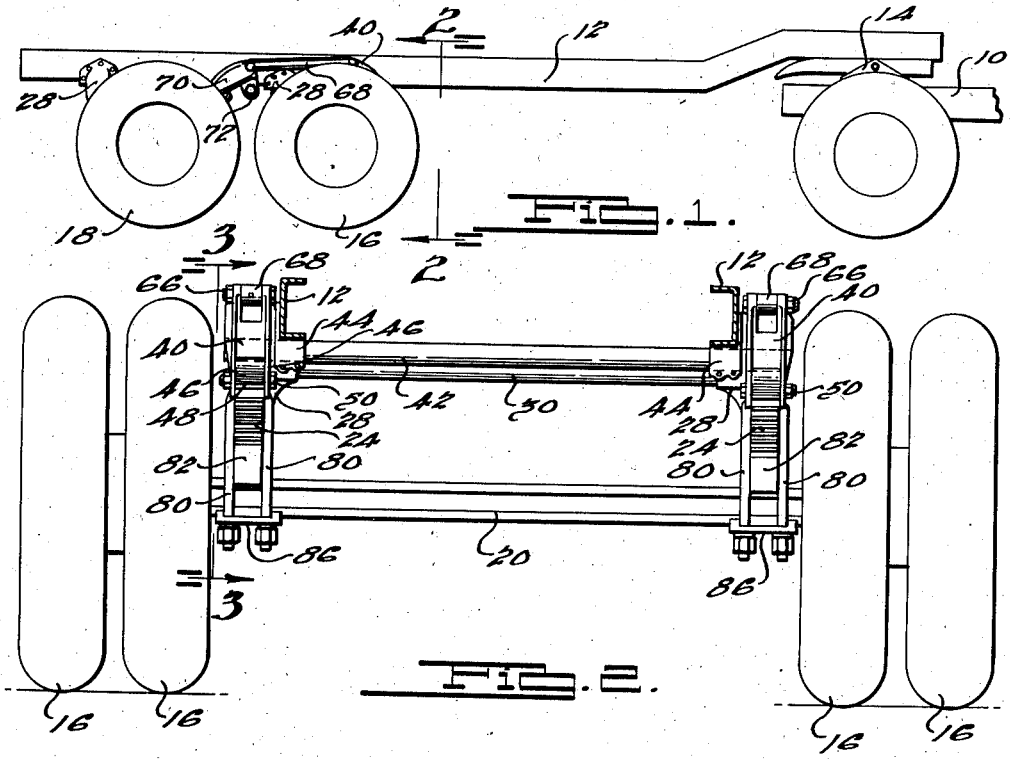
INVENTOR
Frederick M. Reid.
BY
Harness, Dickey & Pierce
ATTORNEYS.

April 21, 1942.　　　F. M. REID　　　2,280,302
VEHICLE UNDERCARRIAGE
Filed March 16, 1940　　　2 Sheets-Sheet 2
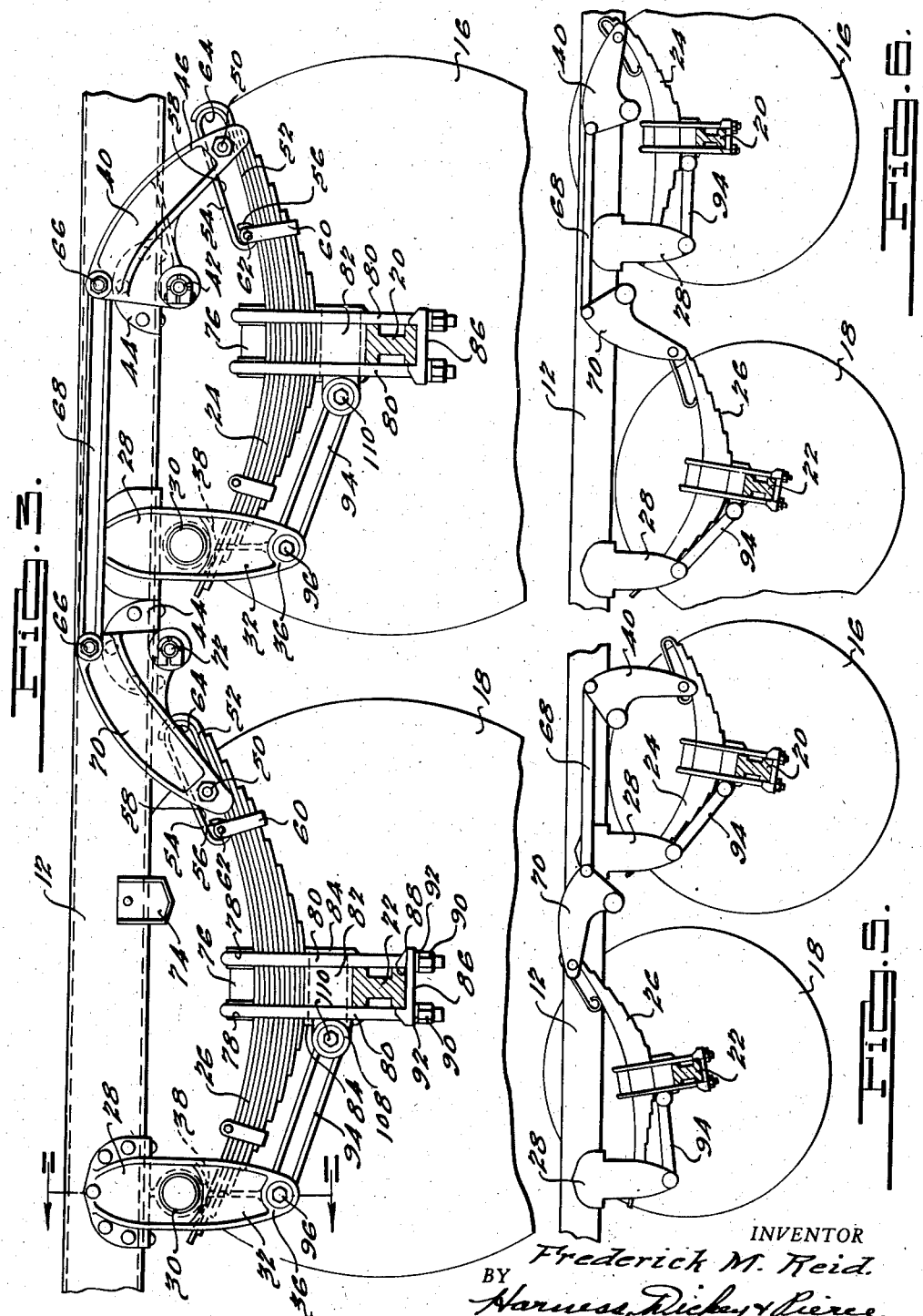
INVENTOR
Frederick M. Reid.
BY
Harness, Dickey & Pierce.
ATTORNEYS.

Patented Apr. 21, 1942

2,280,302

UNITED STATES PATENT OFFICE 2,280,302

VEHICLE UNDERCARRIAGE

Frederick M. Reid, Detroit, Mich., assignor to Fruehauf Trailer Company, Detroit, Mich., a corporation of Michigan Application March 16, 1940, Serial No. 324,365

2 Claims. (Cl. 280—124)

The present invention relates to improvements in multiple wheel road vehicles and particularly to improvements in spring suspensions for tandem axles in such vehicles.

One of the primary objects of the present invention is to provide improved spring suspension constructions which permit greater vertical movement of the axle than in prior constructions.

Another object of the invention is to provide improved spring suspension constructions having a minimum number of wearing parts in which shackles are eliminated, thereby effecting economies as in old constructions where such shackles were used they were subjected to violent mechanical action that resulted in their wear and destruction in a comparatively short time.

Another object of the invention is to provide an improved spring suspension construction having a roller disposed in an elongated eye formed at one end of one of the springs in which the eye limits downward movement of the axle and in which a bumper on the frame serves to limit upward movement of the axle.

A more specific object of the present invention is to provide an improved spring suspension construction of the type mentioned in which an elongated eye is formed on one end of the spring having one end of the eye anchored to the spring clip.

Other objects of the invention will become apparent from the following specification, the drawings relating thereto and from the claims hereinafter set forth.

In the drawings, in which like numerals are used to designate like parts in the several views throughout:

Figure 1 is a fragmentary side elevational view of a multiple wheel road vehicle having a spring suspension construction, according to the present invention, associated therewith;

Fig. 2 is an enlarged cross-sectional and elevational view taken substantially along the line 2—2 of Fig. 1;

Fig. 3 is an enlarged, fragmentary side elevational view, with parts in cross-section, taken substantially along the line 3—3 of Fig. 2;

Fig. 4 is an enlarged cross-sectional view taken substantially along the line 4—4 of Fig. 3;

Fig. 5 is a diagrammatic, side elevational view of the structure shown in Fig. 3, on a reduced scale, illustrating the elements in one position; and, Fig. 6 is a view similar to Fig. 5, illustrating the elements in another position.

Referring to the drawings, an automotive tractor is partially indicated at 10 with a trailer frame 12 connected thereto in the usual way through a fifth wheel means 14. The trailer is adapted to be supported at its forward end through the usual retractable ground supporting means (not shown) when it is disconnected from the tractor.

The tractor is supported at its rear end by ground wheels 16 and 18 arranged in tandem and supported on tandem axles 20 and 22, respectively. The axles 20 and 22 are connected to leaf springs 24 and 26, respectively, which in turn are mounted on the trailer frame 12 by spring suspension means to be described in detail hereinafter.

Such spring suspension means include a downwardly directed hanger 28 fixed to the longitudinally extending supporting members of the frame 12. One of such hangers 28 is disposed adjacent the rear end of each of the springs 24 and 26 and the corresponding hangers on the opposite sides of the frame have transversely extending bracing members 30 secured thereto.

The hangers 28 are formed with spaced apart depending legs 32 formed with aligned openings 35 and bosses 36 adjacent the lower ends thereof. The legs 32 form a generally U-shaped construction with the base or bite 38 slightly rounded longitudinally of the vehicle to form a spring bearing surface. The rear end of the leaf spring 24 or 26 is adapted to be received between the legs of its corresponding hanger 28 so that the top surface of the uppermost leaf of the spring bears against the curved bearing surface 38. The bearing action is similar to that disclosed in the co-pending application of Frederick M. Reid, Serial No. 247,607, filed December 24, 1938, now Patent No. 2,191,941.

The forward end of spring 24 is connected to the frame 12 through a bellcrank lever member 40, which is pivotally connected through a pivot pin 42 to a bracket 44 fixedly secured to the frame 12. The pivot pin 42 is located above the spring 24 and adjacent the front end of the spring but spaced rearwardly of such forward end. The pivot member 42 may be in the form of a shaft which extends transversely of the frame 12 and is connected to the bracket 44 on the opposite side of the frame.

The member 40 is formed with spaced apart legs 46 and a cylindrical roller member 48 is mounted on a transversely extending pin 50 fixed to the lower end of the member 40.

In order to provide the connection between the spring 24 and the member 40, the uppermost leaf 52 of the spring is bent and reversed upon itself as indicated at 54, terminating in a substantially closed loop 56, and thereby forming an elongated eye which provides a guideway 58. The reversed portion 54 is secured to the spring assembly by means of one of the spring clips 60 which embraces the leaves of the spring and has a pin 62 which extends through the eye of the loop 56 to fixedly secure that end of the reversely bent portion to the spring assembly.

The distance between the legs 46 is substantially equal to the width of the spring 24 so that the spring may be received between such legs with the roller 48 slidably disposed within the guideway 58. It will thus be seen that a positive connection is provided between the forward end of the spring 24 and the member 40, yet upon deflection of the spring, the roller 48 moves within the guideway 58 formed by the elongated eye. The downward movement of the spring 24 is limited by the rear end of the eye, when the roller 48 abuts thereagainst.

The opposite or upper end of the bellcrank member 40 has a pivot pin 66 fixedly connected thereto, which has pivotally connected thereto the forward end of a rigid connecting rod member 68. Such rod member 68 is received between the upper ends of legs 46 and is provided with an opening through which the pivot pin 66 extends.

The forward end of spring 26 is connected to the frame 12 by means of a bellcrank member 70 which is similar in construction to the bellcrank member 40 above described. The detailed elements of member 70 are given reference numerals corresponding to those used above in connection with the member 40 except that the pivot shaft for the member 70 is indicated at 72 for the purpose of clarity. The bracket 44 with the pivot shaft 72 is located forwardly of the end of spring 26 and rearwardly of the rear end of spring 24, as shown best in Fig. 3.

The forward end of spring 26 is reversely bent to form a guideway 58 in the same manner as spring 24 and is connected to a roller 48 connected to the lower end of bellcrank member 70 by means of the pivot pin 66.

A bumper member 74 is fixed to the under side of the frame of the trailer 12 above the spring 26 and serves to limit the upward movement of such spring. The hub of member 40 serves as a bumper to limit upward movement of spring 24. The downward movement of spring 26 is limited by the forward end of the elongated spring eye at the forward end of the spring.

The axles 20 and 22 are disposed under their respective springs 24 and 26 at substantially the longitudinal centers thereof and may be connected to their respective ground wheels 16 and 18 in the usual way. The axles 20 and 22 are connected to their respective springs by similar assemblies which include a top member 76 which has the top surface thereof transversely rounded with the bottom surface thereof bearing against the top of the leaf spring. The top surface of member 76 is formed with semi-circular upwardly disposed channels 78 at the front and rear sides thereof for the reception of strap members in the form of U-bolts 80.

Another member 82 is disposed under the spring with the top surface thereof bearing against the under side of the spring and the under surface thereof bearing against the top of its corresponding axle 20 and 22. Such under surface is preferably in the form of a downwardly directed channel which receives the axle therein. Such member 82 is preferably provided with outwardly disposed flanges 84 at the sides thereof so that the legs of the U-bolts bear against the inner and outer faces of member 82 and against the flanges 84 so that the member 82 is fixed in the assembly.

An axle seat 86, which is formed with an upwardly disposed channel 88, is positioned under its corresponding axle 20 or 22, so that the lower edge of the axle is received within the channel 92.

The legs of the U-bolts 80 extend downwardly along the sides of the spring, the member 82, bears against the front and rear sides of the axle, and extends through openings provided in the axle seat 86. Nuts 90 are threadably received over the lower threaded ends of the U-bolts 80 and bear against washers 92, which, in turn, bear against the under surface of the member 86. By drawing the nuts 90 upwardly, it will be evident that the U-bolts 102 are firmly positioned and draw the top member 76, the member 82, and the axle seat 86 together so that a rigid connection is provided between the axles 20 and 22 and their respective springs 24 and 26.

A radius rod 94 is disposed under each spring 24 and 26 and extends longitudinally thereof toward the hanger 28. Each radius rod 94 is adapted to be pivotally connected to the hanger 28 on each side of the vehicle. The manner in which each rod 94 is pivotally connected to its hanger 28 is best shown in Fig. 4, in which the rear end of the rod 94 is received between the lower ends of legs 32.

A pivot pin 96 is received through the aligned openings 34 and is embraced by a bearing sleeve 98. The sleeve 98 is received within a pivot opening 101 in the adjacent end of the radius rod 94, so that the radius rod is pivotally mounted with respect to the hanger 28.

Rubber bushings 102 are disposed within openings 34 between the inner surfaces thereof and the outer surfaces of the sleeve 98, so that a resilient pivotal mounting is provided with the radius rod. Dish-shaped end members 104 are disposed over the ends of bolts 96, and are so shaped that they bear against the ends of the rubber bushings 102, so that when a nut 106 on the threaded end of bolt 96 is drawn up on the bolt, the bushings 102 and sleeve 98 are securely held in position so that the radius rod is securely positioned for pivotal mounting with respect to the hanger.

In order to pivotally mount the forward end of each of the radius rods 94, spaced flanges 108 are formed integral with the member 82 and project toward the hanger 28. Such flanges are provided with openings therethrough similar to the openings 34, and receive therebetween the forward end of member 94.

A pivot pin 110, which is similar to the pivot pin 96, is received through such openings and through a corresponding opening in the adjacent end of rod 94. Sleeves, bushings, and end members, corresponding to the sleeve 98, bushings 102, and end members 104, above described, are provided to pivotally mount the rod 94 with respect to the member 82.

While the above description has been directed to just one side of the vehicle, it will be appreciated that the other side of the vehicle is provided with a similar under-construction.

In the action of the structure above described, when the vehicle passes over a rough surface it will be seen that the mounting for each of the axles, together with the interconnection through the rigid member 68 with the bellcrank members 40 and 70, is such that the load is distributed between the axles and a portion of the shock applied to one axle is immediately transmitted to the other axle. Such action is illustrated by a comparison of Figs. 5 and 6, wherein the elements are shown in comparative positions when the axles are displaced relative to each other.

It will also be appreciated that by the construction of the present invention the four-spring, tandem under-construction disclosed herein provides a minimum number of wearing parts while providing the maximum in load cushioning. The axles are positively aligned, and are in proper relation to the frame at all times. The connection between the bellcrank members 40 and 70 with their respective springs through the elongated guideways formed by the elongated eyes, permits greater vertical movement of the axles than in prior constructions.

Formal changes may be made in the specific embodiment of the invention described without departing from the spirit and substance of the invention, the scope of which is commensurate with the appended claims.

What is claimed is:

1. A vehicle comprising a frame, a pair of axles arranged in tandem beneath said frame, a spring for each axle at each side of said frame, means including a hanger for slidably connecting one end of each of said springs to the frame, a radius rod below each of said springs pivotally connected at one end with one of said hangers, means pivotally connecting the opposite end of said radius rods with the adjacent axle, means connecting the other end of each of said springs to the frame, said last named means including a bellcrank member fulcrumed on said frame adjacent each of said other ends, a roller secured to one end of each of said bellcrank members, means forming an elongated eye fixed to each of said springs adjacent each of said other ends and slidably receiving therein its corresponding roller, and rigid means connecting the other ends of said bellcrank members at the same side of the frame with each other.

2. A vehicle comprising a frame, a pair of axles arranged in tandem beneath said frame, a spring for each axle at each side of said frame, means including a hanger for slidably connecting one end of each of said springs to said frame, a radius rod below each of said springs pivotally connected at one end with one of said hangers, a spacer member between each of said springs and the adjacent axle, means pivotally connecting the opposite end of said radius rods to said spacer members, means connecting the other end of each of said springs to said frame, said last named means including a bellcrank member fulcrumed on said frame adjacent each of said other ends, a roller secured to one end of each of said bellcrank members, means forming an elongated eye fixed to each of said springs adjacent each of said other ends and slidably receiving therein its corresponding roller, and a rigid link pivotally connected to the other ends of the bellcrank members on the same side of the frame, the pivotal connections of the link with the bellcrank members lying in a plane above the fulcrums of said bellcrank members.

FREDERICK M. REID.